United States Patent [19]
Weber

[11] Patent Number: 4,884,403
[45] Date of Patent: Dec. 5, 1989

[54] MODULAR BRAKE ACTUATOR

[75] Inventor: James L. Weber, W. Bloomfield, Mich.

[73] Assignee: ITT Corporation, New York, N.Y.

[21] Appl. No.: 222,462

[22] Filed: Jul. 21, 1988

[51] Int. Cl.$^4$ ............................................. B60T 13/00
[52] U.S. Cl. .................................. 60/547.1; 60/555; 60/593; 60/594; 91/460; 137/627.5
[58] Field of Search .................... 60/547.1, 555, 593, 60/594; 91/460, 280; 137/627.5

[56] References Cited

U.S. PATENT DOCUMENTS

| | | | |
|---|---|---|---|
| 2,352,357 | 6/1944 | Almond | 60/555 X |
| 2,991,762 | 7/1961 | Price et al. | 137/627.5 |
| 3,200,579 | 8/1965 | Thirion | 60/555 X |
| 3,257,811 | 6/1966 | Aiki et al. | 60/555 |
| 3,319,421 | 5/1967 | Kawabe et al. | 60/555 X |
| 4,108,372 | 8/1978 | Brakebill | 137/627.5 X |

FOREIGN PATENT DOCUMENTS

| | | | |
|---|---|---|---|
| 830004 | 1/1952 | Fed. Rep. of Germany | 60/547.1 |
| 897521 | 5/1962 | United Kingdom | 137/627.5 |
| 2062153 | 5/1981 | United Kingdom | 60/547.1 |

Primary Examiner—Robert E. Garrett
Assistant Examiner—Mark A. Williamson
Attorney, Agent, or Firm—Robert P. Seitter

[57] ABSTRACT

A modular brake actuator useful in automotove vehicles includes a mounting base adapted to fit into a complementary opening in and form part of the fire wall between the engine compartment and the driver's cockpit. On one side of the mounting base there are assembled brake operating components and on the other side there are assembled hydraulic components. This module can be easily installed during assembly of the vehicle.

12 Claims, 2 Drawing Sheets

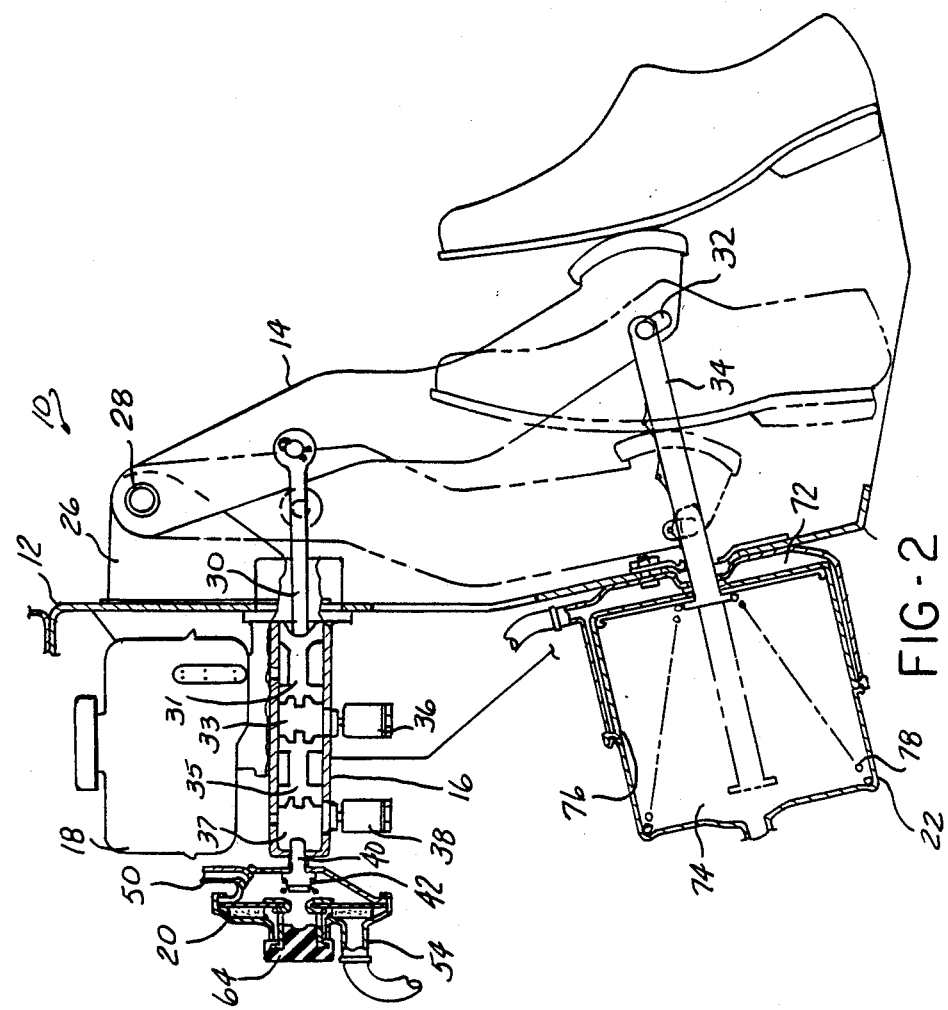
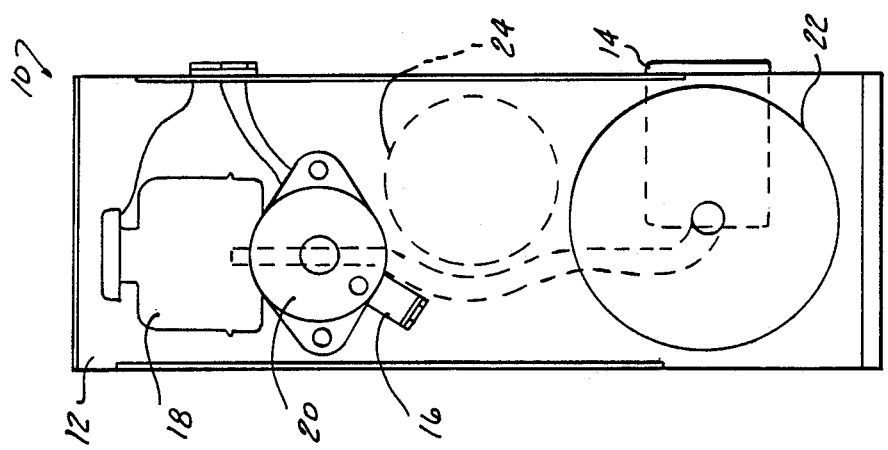

MODULAR BRAKE ACTUATOR

BACKGROUND OF THE INVENTION

This invention relates to a brake actuator system for use in automotive vehicles and, more particularly, to such a brake actuator system that is arranged to be easily packaged as a module and easily installed in a vehicle during its assembly.

Conventional vehicle brake systems have been generally constructed on a piecemeal basis during the assembly line process used to build automotive vehicles. That is, numerous brake system components are individually purchased, inventoried, brought together and assembled along with the rest of the vehicle. Included among the components are: a master brake cylinder-booster module; a brake pedal and its mounting assembly; linkage parts for connecting the brake pedal to the master brake cylinder; and pipe and pipe connections from the master brake cylinder to the wheel brake cylinders. To assemble these parts, the master brake cylinder-booster module is mounted on one side of the fire wall in the engine compartment; the brake pedal is assembled and mounted on the other side of the fire wall in the driver's cockpit; the linkage is assembled and connected between the brake pedal and master brake cylinder; and the master brake cylinder is connected to the wheel brake cylinders. Once the brake system is completed, it is filled with brake fluid and tested. If it is not operating properly, the system must be checked to find the problem and then remedial action must be taken.

There are several problems associated with this conventional approach. It is a time consuming, awkward, and thus expensive process; improper assembly or assembly of defective parts can occur, either of which requires expensive diagnostic and remedial procedures; and, inventory and handling costs for the numerous components add to the cost of the brake system.

SUMMARY OF THE INVENTION

It is an object of this invention to provide a modular brake actuator that includes numerous preassembled parts so as to reduce the assembly, testing and inventory costs for the automotive company assembling vehicles.

It is another object of this invention to provide a master brake cylinder and a separate booster that are relatively compact and can be more easily accommodated in the confined space of a vehicle engine compartment.

It is still another object of this invention to provide a compact vacuum controller for controlling the operation of a vacuum brake booster.

Finally, it is an object of this invention to provide a brake actuator that is easy to install in a vehicle and allows for inspection and testing before its installation in the vehicle and that is highly reliable and relatively inexpensive.

These and other objects are accomplished by providing a brake actuator system comprising a mounting base adapted to be attached to and form part of a vehicle fire wall. A master brake cylinder and a brake booster are each attached to one side of the mounting base. A controller is also provided and is responsive to the master brake cylinder for controlling the operation of the brake booster. A brake pedal is attached to the other side of the mounting base and is associated with first actuating means for operating the master cylinder. Second actuating means is provided for connecting the output of the brake booster to the brake pedal so that the movement of the brake pedal is assisted by the booster.

BRIEF DESCRIPTION OF THE DRAWING

For a better understanding of the invention reference is made to the following description of preferred embodiments taken in conjunction with the figures of the accompanying drawing, in which:

FIG. 1 is a front plan view of a modular brake actuator in accordance with the invention;

FIG. 2 is a side view, partly in section, of the modular brake actuator of FIG. 1;

DETAILED DESCRIPTION OF PREFERRED EMBODIMENTS

Figure 3:
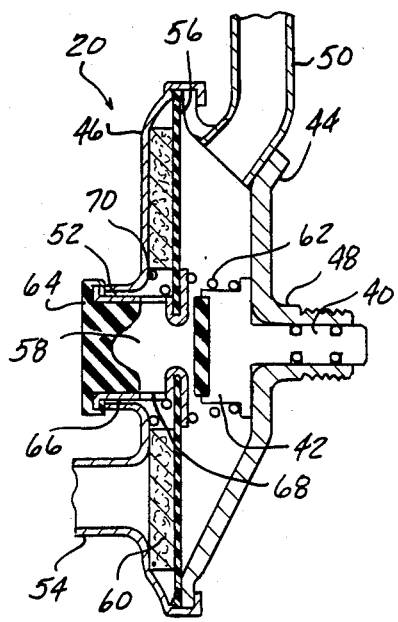
FIG. 3 is an enlarged section view of the vacuum controller illustrated in FIGS. 1 and 2.

With reference to FIGS. 1-3 of the drawing, there is illustrated a modular brake actuator 10 comprising a mounting base 12 one side of which carries a brake pedal 14 and its associated mounting assembly and the other side of which carries brake operating components such as a master cylinder 16 and associated brake fluid reservoir 18, a controller 20 and a brake booster 22. The controller 20 is associated with and operated by the master cylinder 16 to control the operation of the brake booster 22 which is, in turn, operatively connected to the brake pedal. 14. Operation of the vacuum booster 22 applies a force to the brake pedal 14 to assist the brake pedal force applied by the driver when braking the vehicle.

The mounting base 12 is a sheet metal member having a suitable shape to accommodate the components comprising the modular brake actuator 10. In the embodiment of FIGS. 1-3 it is generally rectangular and is otherwise formed so that it fits into a complementary opening formed in the vehicle fire wall between the engine compartment and the driver's cockpit. It is also formed with an enlarged opening 24 to accommodate the passage of the steering column and includes means for attaching it to the fire wall which means can be in the form of openings to receive threaded fasteners.

On the one side of the mounting base 12, the side facing the driver's cockpit, there are provided suitable mounting lugs 26. These mounting lugs 26 are formed with openings which carry a pivot pin 28 which, in turn, carries the upper end (as viewed in FIG. 2) of the brake pedal 14. Thus, the brake pedal 14 is pivotally mounted for rotation about its upper end. Intermediate its ends and closer to the upper than lower end, the brake pedal 14 is connected to an actuating rod 30 which extends through the mounting base 12 for operative connection with the master cylinder 16. Adjacent its lower end, the brake pedal 14 is formed with a lost motion slot 32 which is used to connect it to an actuating rod 34 extending through the mounting base 12 for operative connection with the booster 22.

On the other side of the mounting base 12, the side facing the engine compartment, the master cylinder 16 is mounted so that its input end is connected to the actuating rod 30. The master cylinder 16 is any generally conventional such device and in this embodiment is a conventional tandem master cylinder used in dual circuit brake systems. Such a master cylinder is shown schematically in FIG. 2 and includes a push-rod piston 31 adjacent its input end which is connected to the actuating rod 30 so that it is slideable toward the other end (the end opposite the input end) of the master cylinder when the brake pedal 14 is depressed. Such movement of the push-rod piston closes a port between the reservoir 18 and a first pressure chamber 33 and pressurizes brake fluid in the first pressure chamber inside the master cylinder. This pressure is transmitted to the wheel brake cylinders of one brake circuit through a port 36 and its associated brake lines (not shown). The pressure in the pressure chamber also moves an intermediate piston 35 inside the master cylinder toward the other end thereof so that it too closes another port between the reservoir 18 and a second pressure chamber 37 and pressurizes brake fluid in this second pressure chamber. This pressure is transmitted to the wheel brake cylinders of the second brake circuit through a port 38 and its associated brake lines (not shown).

The other end of the master brake cylinder 16, sometimes referred to as the output end, carries the controller 20 and is slightly modified to operate it. Thus, the output end of the master cylinder 16 includes an opening in the end wall of its housing to receive a valve stem 40 which extends from a control valve member 42. The valve stem 40 and control valve member 42 are part of the controller 20. The free end of the valve stem 40 is received in the second pressure chamber 37 in the master cylinder 16 so that when the brake pedal 14 is depressed to apply the brakes, the pressure in this second chamber acts on the free end of the valve stem 40 and drives it axially away from the master cylinder 16.

The controller 20 is best seen in FIG. 3. In this embodiment, the controller 20 is a vacuum controller because the brake booster 22 is a vacuum booster. The vacuum controller 20 includes a housing made of two cup-shaped sheet metal pieces 44 and 46 each having an open end at which they are joined together. The sheet metal piece 44 is formed with a central opening and a sleeve 48 that slideably and sealingly receives the valve stem 40; this sheet metal piece is also formed with a generally radially extending port 50 and a nipple which receives one end of a conduit connected at its other end to a vacuum source, e.g., the constant engine vacuum.

The other sheet metal piece 46 is formed with a central opening 52 from which extends a sleeve. The opening 52 selectively communicates with the atmosphere or is closed as will be explained hereinafter; this sheet metal piece is also formed with another opening 54 and which extends a sleeve that receives one end of a conduit (not numbered, but shown in FIG. 2) connected at its other end to the vacuum booster 22.

Clamped between the sheet metal pieces 44 and 46 is the outer periphery member a somewhat rigid, yet flexible diaphragm 56 that divides the interior of the housing into the two chambers—one formed by sheet metal piece 44 and the other formed by 46. The diaphragm 56 is formed with a central opening 58 that is generally aligned with the valve member 42. Between the inner and outer peripheries of the diaphragm 56 is a filter 60 one face of which bears on the inner surface of the sheet metal piece 46 and the opposite face of which bears on the adjacent face of the diaphragm. As clearly seen in FIG. 3, the filter 60 covers the opening 54 and is formed with a central opening that is aligned with the opening 58. The filter 60 is preferably made of spun glass, but can be made of other suitable materials that provide a suitable filtration for the air flow, support the diaphragm 56 and that, for reasons to be made clear, is slightly yieldable.

A compression spring 62 is also provided and on one end it bears on the surface of the diaphragm 56 surrounding its central opening 58 and at its opposite end it bears on an enlarged flange portion formed on the valve member 42. Thus, the spring 62 biases the valve member 42 away from the opening 58 into engagement with the inner surface of the sheet metal piece 44. In this position of the valve member a flow passage is maintained from the opening 50, through the opening 58 to the opening 54. If master cylinder fluid pressure is applied against the end face of the valve stem 40, the pressure force overcomes the spring force and moves the valve member 42 against the central opening 58 of the diaphragm 56 to close that opening and close the just described flow passage.

Also provided is a rubber or suitable plastic valve member 64 carried on a hollow cylindrical actuating rod 66 slideably received in the sleeve extending from the opening 52. The actuating rod 66 extends to the diaphragm 56 adjacent the opening 58 and is formed with openings 68 in the cylindrical wall adjacent the diaphragm. As shown in FIG. 3, the valve member 64 closes the opening 52 at the free end of its sleeve and is biased to this position by a compression spring 70. In this position, the flow passage from openings 50 to 54 includes the openings 68 and connects the vacuum source to the vacuum booster 22. When the valve member 42 is operated by the pressure in the master cylinder 16 to close the opening 58, the movement of the valve member against the diaphragm 56 causes it to deflect against the bias of the spring 70 and move the actuating rod 66 in the sleeve extending from opening 52 to move the valve member 64 away from the opening 52. The vacuum passage is now closed, but an atmospheric flow passage is provided from the opening 52 through the openings 68 to the opening 54.

The vacuum booster 22 can be any conventional construction. In the embodiment described here it includes a sheet metal housing divided into chambers 72 and 74 by a diaphragm 76. The chamber 72 is connected to the opening 54 of the vacuum controller 20 and the chamber 74 is connected to the vacuum source. The rod 34 extends through the booster housing and is connected to the diaphragm 76 for movement with it. The diaphragm 76 and rod 34 are biased to the position illustrated in FIG. 2 by a spring 78 in chamber 74. When the brake is not applied, the diaphragm 76 and rod 34 are, thus, in the position illustrated.

Operation of the modular brake actuator 10 will be explained after first describing the positions of its various components before the brakes are applied. These positions are illustrated in FIG. 2. The brake pedal 14 is in a rest position as shown by the solid lines so that the master brake cylinder is not pressurized. The valve member 42 is thus spaced from the opening 58 and establishes communication from the opening 50 to the opening 54. In addition, the valve member 64 closes the opening 52. Because the valve member 42 is in open position and because the opening 50 is connected to a vacuum source, a vacuum is present in each of the booster chambers 72 and 74. The rod 34 is thus in its solid line position.

When the brake is applied, the pedal 14 is depressed as shown by dotted lines in FIG. 2. This movement of the pedal 14 drives the rod 30 to pressurize brake fluid in the two pressure chambers in the master cylinder 16. As explained previously, this pressure is transmitted through openings 36 and 38 to the wheel brake cylinders and also to the end face of valve stem 40. In turn, the valve stem 40 and valve member 42 are driven into engagement with the diaphragm 56 to close the opening 58 and flex the diaphragm to move the rod 66 is that the valve member 64 is spaced from the opening 52. Communication with the atmosphere is thus provided and the atmospheric pressure is transmitted through the openings 68, filter 60 and opening 54 to the chamber 72 in the booster 22 where it acts on one side of the diaphragm 76. The pressure on the diaphragm 76 acts to move it and the rod 34 toward the left, as viewed in FIG. 2, so that the rod pulls on the brake pedal 14. The pulling force assists the operation of the brake pedal 14 and reduces the force that need be applied by the driver.

When the driver releases the brake pedal and the pressure in the master cylinder 16 is released, the spring 62 opens the valve member 42 and the spring 70 closes the valve member 64. Communication between the vacuum source and the chamber 72 is reestablished so that a vacuum is again applied in that chamber. The spring 78 now assists movement of the diaphragm 74 and rod 34 back to the solid line position shown in FIG. 2.

Figure 5:
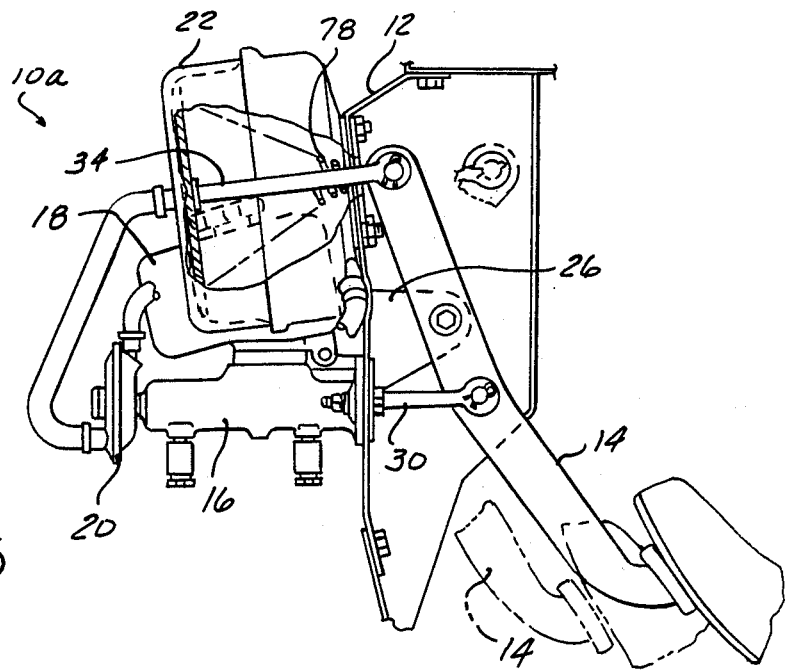
FIG. 5 is a side view of the modular brake actuator illustrated in FIG. 4.
Figure 4:
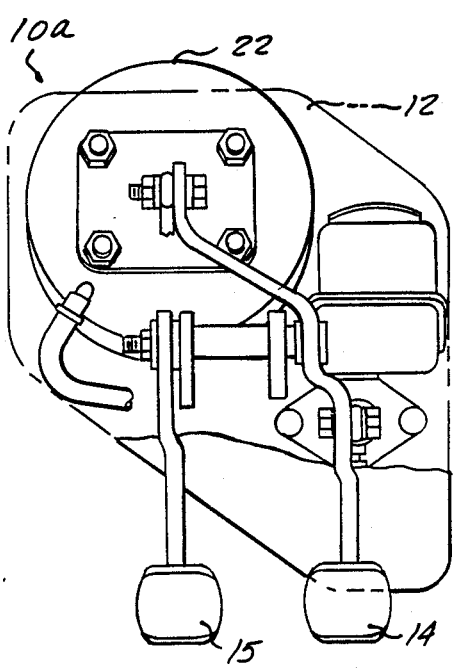
FIG. 4 is a front plan view of another modular brake actuator in accordance with this invention.

Another modular brake actuator 10a is disclosed in FIGS. 4 and 5 of the drawing. The modular brake actuator 10a is similar to the modular brake actuator 10 disclosed in FIGS. 1–3 and like reference numerals will be used for like parts. Similar to the embodiment of FIGS. 1–3, the modular brake actuator 10a includes the mounting base 12 one side of which carries the brake pedal 14 and, as best seen in FIG. 4, a clutch pedal 15. It should be understood that the mounting base 12 can also carry an accelerator pedal or any other desired components. The other side of the mounting bracket 12 carries the brake operating components, that is, the master cylinder 16, brake fluid reservoir 18, vacuum controller 20 and vacuum booster 22. These brake operating components are of the same construction as in the embodiment of FIGS. 1–3.

Modular brake actuator 10a differs from actuator 10 in that the vacuum booster 22 pushes rather than pulls the brake pedal 14. To this end, the brake pedal 14 is pivoted to the mounting lugs 26 intermediate its ends as clearly seen in FIG. 5. The actuating rod 30 that operates the master cylinder 16 is connected to the brake pedal 14 at a point between the pivot connection and the toe plate. At the opposite end of the brake pedal 14, it is connected to the actuating rod 34.

The other differences include locating the vacuum booster 22 adjacent the top rather than the bottom of the mounting bracket to enable the actuating rod 34 to connect to the upper end of the brake pedal 14. In addition, the vacuum controller 22 is connected to the booster chamber 74 rather than chamber 72—the latter chamber being connected to the vacuum source. Additionally, the spring 78 is in chamber 72 rather than chamber 34. In this embodiment, the chamber 74 is selectively connected to a vacuum source or atmosphere depending on the position of the vacuum controller and the chamber 72 is constantly connected to the vacuum source.

The operation of the modular brake actuator 10a should be obvious as it is essentially the same as that of actuator 10. When the brake pedal 14 is depressed, the master cylinder 16 and vacuum controller 20 operate exactly the same as described above. However, the booster chamber 74 is connected to the atmosphere and this pressure acts on the diaphragm 76 to move it and the actuating rod 34 toward the right, as seen in FIG. 5. The actuating rod 34 thus pushes the upper end of the brake pedal 14 to assist the application of the brakes. Release of the brake pedal is also obvious as it too is essentially the same as that of actuator 10 except that the actuating rod 34 will move to the left as seen in FIG. 5.

From the foregoing it should be clear that a modular brake actuator in accordance with this invention provides numerous economies. It can be tested before assembly to the vehicle, reduces the vehicle assemblers inventory costs and is relatively easy and inexpensive to install during the assembly of a vehicle.

The particular embodiments disclosed here provide other advantages. The booster is not integral with the end of the master cylinder, but is mounted on the mounting base adjacent the master cylinder. This saves space under the hood to accommodate the other engine components.

While in the foregoing two embodiments of the invention have been disclosed, it should be obvious to those skilled in the art that various changes and modifications can be made without departing from the scope of the invention as recited in the claims.

What is claimed is:

1. A modular brake actuator comprising a mounting base having first and second surfaces on opposite sides thereof, a brake pedal pivotally mounted to one surface of the mounting base for movement from a rest position to brake application positions, a master cylinder mounted to the other surface of the mounting base and first actuating means operatively connected between the brake pedal and the master cylinder for operating the master cylinder in response to the brake pedal, booster means also mounted on the other surface of the mounting base and second actuating means operatively connected between the booster means and the brake pedal for transmitting a force from the booster means to the brake pedal that assists movement of the brake pedal from the rest position to a brake application position, controller means between the master cylinder and the booster means, said controller means being responsive to the operation of the master cylinder for operating the booster means and developing the assisting force.

2. A modular brake actuator in accordance with claim 1 wherein the brake pedal has a first end where it is pivotally mounted to the one surface of the mounting base and a second end where a brake application force is applied, said second actuating means being operatively connected to the brake pedal intermediate its first and second ends so that the second actuating means assists movement of the brake pedal by pulling it away from its rest position toward a brake application position.

3. A modular brake actuator in accordance with claim 2 wherein the first actuating means is connected to the brake pedal between the first end and the operative connection of the second actuating means to the brake pedal.

4. A modular brake actuator in accordance with claim 1 wherein the brake pedal has a first end and a second end where a brake application force is applied, said brake pedal being pivotally mounted to the one surface of the mounting base intermediate its ends, said second actuating means being operatively connected to the brake pedal adjacent its first end so that the actuating means assists movement of the brake pedal by pushing it away from its rest position toward a brake application position.

5. A modular brake actuator in accordance with claim 4 wherein the first actuating means is connected to the brake pedal between the second end and the pivotal mounting of the brake pedal to the mounting base.

6. A modular brake actuator in accordance with claim 1 wherein the controller means is mounted on the master cylinder and includes a first opening for controlling it to a vacuum source, a second opening communicating with the atmosphere and a third opening communicating with the booster means, said controller means also including valve means operative by the master cylinder for selectively connecting the third opening to either the first or second openings.

7. A modular brake actuator in accordance with claim 6 wherein the booster means includes two chambers, one of said chambers communicating with the third opening in said controller means and the other of said chambers including an opening for connecting it to a vacuum source.

8. A modular brake actuator in accordance with claim 1 wherein said mounting base includes means for attaching it to a fire wall.

9. A modular brake actuator in accordance with claim 1 wherein the mounting base carries other pedal members and is formed with an opening for accommodating a steering column.

10. A vacuum controller comprising a housing and a flexible diaphragm dividing the housing into two chambers, said diaphragm having a first opening forming therein providing communication between said chambers, a first valve member in one of said chambers, said first valve member being aligned with said first opening for movement between a first position wherein the valve member closes said first opening and a second position wherein the first valve member is spaced from said opening, first spring means biasing said first valve member to its second position, a second opening, said second opening beng formed in said housing for communication between the atmosphere and the other of said chambers and being aligned with said first opening and with said first valve member, a second valve member carried in said second opening for movement between a first position wherein the second valve member closes said second opening and a second position wherein the second valve member is spaced from said second opening, a cylindrical member extending from said second valve member, the free end of said cylindrical member bearing on the surface of said diaphragm adjacent said first opening, movement of said first valve member to its first position deflecting said diaphragm and moving said cylindrical member and said second valve member from its first position to its second position and second spring means biasing said second valve member to its first position.

11. A vacuum controller in accordance with claim 10 wherein said cylindrical member is formed with openings that provide communication between said first opening and the other of said chambers.

12. A vacuum controller in accordance with claim 11 wherein said housing is formed with a vacuum opening communicating with said one of said chambers and with a discharge opening communicating with the other of said chambers.

* * * * *